US011904658B2

(12) United States Patent
Enke et al.

(10) Patent No.: US 11,904,658 B2
(45) Date of Patent: Feb. 20, 2024

(54) VENTILATION DEVICE FOR THE INSIDE OF A MOTOR VEHICLE

(71) Applicant: Volkswagen Aktiengesellschaft, Wolfsburg (DE)

(72) Inventors: Lukas Enke, Wolfsburg (DE); Ricardo Buder, Dresden (DE); Timo Michel, Nordhalben (DE); Olaf Uhlenbusch, Marktzeuln (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 795 days.

(21) Appl. No.: 17/023,325

(22) Filed: Sep. 16, 2020

(65) Prior Publication Data

US 2021/0001687 A1 Jan. 7, 2021

Related U.S. Application Data

(63) Continuation of application No. PCT/EP2019/056373, filed on Mar. 14, 2019.

(30) Foreign Application Priority Data

Mar. 16, 2018 (DE) ............... 10 2018 106 156.0

(51) Int. Cl.
*B60N 2/56* (2006.01)
*B60H 1/24* (2006.01)
*B60H 1/00* (2006.01)

(52) U.S. Cl.
CPC ......... *B60H 1/245* (2013.01); *B60H 1/00285* (2013.01); *B60H 1/243* (2013.01);
(Continued)

(58) Field of Classification Search
CPC ............... B60R 7/06; B60R 2011/0007; B60R 2011/008; B60R 11/00; B60R 7/04; B60H 1/247; B60H 1/3407
(Continued)

(56) References Cited

U.S. PATENT DOCUMENTS 4,870,895 A * 10/1989 Mayer .................... B60H 1/247
454/122
6,416,116 B1 * 7/2002 Stanton .............. B61D 27/0018
454/108
(Continued)

FOREIGN PATENT DOCUMENTS

DE 10110191 A1 9/2002
DE 10242805 A1 9/2003
(Continued)

OTHER PUBLICATIONS

International Search Report dated Aug. 1, 2019 in corresponding application PCT/EP2019/056373.

*Primary Examiner* — Pinel E Romain
(74) *Attorney, Agent, or Firm* — Muncy, Geissler, Olds & Lowe, P.C.

(57) ABSTRACT

A ventilation device for the inside of a motor vehicle, having at least one air outflow element and at least one associated directional element. The at least one air outflow element is provided in a functional arrangement with an air channel element. The air channel element represents the connection to a supply device as part of an air conditioning system. At least one light element is also provided. The arrangement of the at least one directional element and the at least one air outflow element work together so that the ventilation device can be continuously adjusted at least between two inside ventilation conditions. The at least two ventilation conditions respectively differ at least by means of a direction of outflowing air directed directly into the inside and directed (Continued)

indirectly along a roof liner designed for this reason in relation to a seat region of the motor vehicle.

12 Claims, 11 Drawing Sheets

(52) U.S. Cl.
CPC ........... *B60H 1/246* (2013.01); *B60N 2/5628* (2013.01); *B60H 1/247* (2013.01); *B60H 2001/00185* (2013.01); *B60H 2001/00235* (2013.01)

(58) Field of Classification Search
USPC .................................................. 296/37.8, 208
See application file for complete search history.

(56) References Cited

U.S. PATENT DOCUMENTS

| | | | |
|---|---|---|---|
| 6,966,829 B1* | 11/2005 | Hier | B60H 1/247 296/70 |
| 7,581,785 B2* | 9/2009 | Heckmann | B60H 1/00407 297/180.12 |
| 9,102,215 B2* | 8/2015 | Kumar | B60H 1/00842 |
| 10,787,054 B2 | 9/2020 | Wiedemann | |
| 11,760,158 B2* | 9/2023 | Snyder | B60H 1/00564 454/152 |
| 2018/0194194 A1* | 7/2018 | Lyubich | B60H 1/00742 |
| 2020/0369122 A1* | 11/2020 | Cho | B60J 7/1642 |
| 2021/0309068 A1* | 10/2021 | Yamamoto | B60K 37/04 |
| 2022/0153202 A1* | 5/2022 | Beyersdorfer | B60R 7/06 |

FOREIGN PATENT DOCUMENTS

| | | |
|---|---|---|
| DE | 102014222139 A1 | 5/2016 |
| DE | 102015112898 A1 | 2/2017 |
| FR | 2845318 A1 | 4/2004 |
| JP | H106745 A | 1/1998 |
| JP | 3156703 U | 1/2010 |
| JP | 2017030684 A | 2/2017 |
| WO | WO2017208658 A1 | 12/2017 |

\* cited by examiner

VENTILATION DEVICE FOR THE INSIDE OF A MOTOR VEHICLE

This nonprovisional application is a continuation of International Application No. PCT/EP2019/056373, which was filed on Mar. 14, 2019, and which claims priority to German Patent Application No. 10 2018 106 156.0, which was filed in Germany on Mar. 16, 2018, and which are both herein incorporated by reference.

BACKGROUND OF THE INVENTION

Field of the Invention

The present invention relates to a ventilation device for an interior of a motor vehicle, in particular in a region of a second seat row.

Description of the Background Art

Oftentimes, many of the air conditioning functions already known today are only available to the front rows of seats. For this purpose, vents with spot/diffuse modes or draft-free ventilation and high-quality climate control elements for controlling the air conditioning functions are known, for example. Moreover, when vents are provided for other regions in the interior of a motor vehicle, for example in the form of rear vents, the size, functions and position are often severely limited by the installation space restrictions in the second seat row. Thus, a development has recently come about that provides high-quality climate control elements for the rear compartment region, for example in top-of-the-line vehicles, with vents in the B pillar or draft-free ventilation in the headliner. These solutions can be provided in addition to the solutions in a center console. Seat heaters, seat ventilation, and neck heaters must also be viewed as already known for assisting a climate control system. In this context, the accessibility of the passengers by means of B column vents is possible to only a limited extent, and frequently only asymmetrically. Moreover, installation space for additional vent functions, for example diffuse or draft-free guidance of airflows, is not immediately available in this region. Reasons for this include the position of the front seats or the front seats themselves, as well as limited space in the center console. Furthermore, installation space in the roof often is limited due to the presence of a glass sunroof. Also, accessibility of the upper parts of the body via vents in the center console is only guaranteed to a limited extent. Thus, solutions have increasingly been proposed recently that place the focus of technical innovation on draft-free ventilation in the headliner.

Thus, in the document DE 101 10 191, a vehicle roof with a cover for closing a roof opening is disclosed that includes at least one air guide duct in order to direct an airflow onto the window pane. At least one means for directing at least a part of the airflow toward a vehicle occupant is also provided. Thus, this solution provides options for providing a direct routing of the air in each case so that a particular desired result can be achieved. Indirect air routing of the airflows is not provided.

In DE 102 42 805, a ventilation device for a motor vehicle is disclosed. Here, an air vent is provided in the headliner of the motor vehicle. The air vent is arranged visibly in the front end of a roof cross member, wherein a roof cross member structure including the roof cross member or parts thereof serves as an air duct. The ventilation device serves to ventilate the passenger compartment indirectly and evenly. An intentional separation between at least two ventilation states in the interior is not provided. Nor is a distinction provided between a direct and an indirect direction of outflowing air.

In DE 10 2014 222 139, which corresponds to US 2017/0232818, a motor vehicle is disclosed. Here, a cooling of the interior or of persons located in the motor vehicle is intended to be accomplished by means of outflowing air, wherein air outflow openings are provided on both sides on opposite longitudinal roof members, corresponding in each case to the number of seat rows. Furthermore, means are provided that detect occupancy by a person of the available seats. A rate of airflow can then thus be directed at a person located in a seat by means of a control system. In particular, provision is made here that an indirect flow results from two airflows moving toward one another. A desired result can then be achieved as a function of how these two airflows are guided by means of throttle valves and air delivery devices.

DE 10 2015 112 898 shows an air conditioning and ventilation system for a motor vehicle. Here, at least one vehicle seat is provided with at least one roof vent by means of a roof vent system. In this design, the roof vent has further components that permit segmentation of the active vent areas. In each segment, an air supply acting vertically into the vehicle passenger compartment acts with a selection of climate zones. A large-area roof vent has a series of openings that assume an open state as a function of a selected segmentation and corresponding climate zone. A segmentation to be divided parallel to the direction of travel is also proposed. Also proposed is an illumination that is operated as a function of the segmentation that has been set. However, the roof vents and the openings together cannot change a direction that is preset in the relevant variant embodiment from vertical or parallel to the direction of travel. An undirected vertical delivery of air to the passenger compartment is realized solely on the basis of a small quantity of air provided. No change of the vertical direction, for example into a flow passing along the headliner, is provided. In this connection, the illumination also cannot indicate such a state.

SUMMARY OF THE INVENTION

It is therefore an object of the present invention to provide a ventilation device for an interior of a motor vehicle that has high comfort on account of flexible adjustment of airflows in a manner that is intuitive for passengers.

In an exemplary embodiment of the invention, provision is made that a ventilation device is provided for an interior of a motor vehicle, in particular in a region of a second seat row. This ventilation device includes at least one air duct element, at least one supply device that is coupled to a first end of the at least one air duct element as part of an air conditioning system of the motor vehicle, at least one air outflow element that is coupled to a second end of the at least one air duct element and is arranged in the non-visible region of the interior, at least one directional element, and at least one lighting element. In this design, the arrangements of the at least one directional element and the at least one air outflow element together attain the result that the ventilation device is continuously adjustable at least between two ventilation states in the interior that each differ with respect to a seat region of the motor vehicle at least by a direction of outflowing air that is aimed directly into the passenger compartment and a direction that is aimed indirectly along a headliner designed for this purpose. In this way, it is possible to achieve high comfort on the basis of a flexible adjustment of airflows in a manner that is intuitive for passengers. In particular, a design of the air outlet is possible such that the actual ventilating function in the ceiling region is not visible. Consequently, high comfort ensues on account of an unrestricted passenger compartment. For example, the center-console vent can be eliminated, so the space that is freed can be used for other purposes. The space can be used for new functions, such as storage compartments. Ventilation concepts for high-quality air conditioning functions in the second seat row are possible by means of the invention. In addition, comprehensive, comfort-based climate control is possible. In this regard, sensing of passenger thermal comfort and automated control of all climate control systems is possible. In this case, because the air conditioning system is coupled to the ventilation device through the supply device, it can be used to carry out a desired control or programming of the ventilation device. Any modules present in the motor vehicle's air conditioning system or coupled thereto can thus interact with the ventilation device. For example, a sensor system for evaluating passenger thermal comfort can be provided. This can be provided in the form of a combination of moisture and temperature sensors in the seat and infrared sensors for facial skin temperature, for example. For example, a new climate control architecture in the rear passenger compartment is possible as a result, such as through ceiling ventilation and back panel vents with programmable ventilation styles. The passenger compartment climate control can thus be tailored individually to the passengers' thermal comfort states. Consequently, a comfort-oriented, predictive automatic climate control system can be provided. Here, the indirect ventilation can be implemented through a flow along the ceiling line. The headliner can be designed such that a Coanda effect, which is to say an airflow adjacent to the ceiling line, is established, for example. Thus, a flow is positioned along the ceiling line such that it is distributed in the compartment and a direct flow onto the occupants is avoided. An indirect or draft-free ventilation function for the vehicle rear compartment is established. In this case, an integration of at least some of the described elements into the lateral ceiling region is provided, for example, in order to convey air along the ceiling line from the outside toward the inside into the passenger compartment of the motor vehicle. The integration of the at least one air duct element can be accomplished in, e.g., the rear roof region of the vehicle, for example through the B or C pillar. In this case, the design of the air outlet in the form of the air outflow element is possible such that an actual ventilating function in the ceiling region is not visible. The technical implementation in the case of a continuous changeover can be such that, e.g., air impinges on only the passenger compartment or on only one window pane, and also such that air impinges on both the passenger compartment and the window pane or passengers. Such transitions are adjustable. The directional element is arranged in the ceiling region, for example, such that a flow pattern of the air outflow element is influenced in a targeted manner. For example, the location of the separation of the airflow can be influenced in a targeted manner. In this way, different ventilation functions can be achieved with one outflow concept. For example, an ability to switch between the defog/defrost function and ventilation of the passenger compartment can be achieved. Optionally, an ability to switch the flow direction between the passenger compartment and side window or simultaneous outflow of the air toward the window pane and the headliner can be achieved, for example in order to minimize an effect of solar irradiation from the side.

The invention can be used in all vehicles with seats in the rear passenger compartment, for example. For example, for mid-range and top-of-the-line vehicles that allow sufficient space for the integration of air ducts or functional surfaces. The invention can also be used in buses or minibuses. Use in aircraft, passenger trains, and tractors would also be possible.

Further, a lighting effect is adjustable as a function of the at least two ventilation states by means of the at least one lighting element. In this way, a corresponding ventilation state can be displayed visually to the passengers as well. The lighting element can be, for example, a light guide or a lighting system for the production or display of the lighting function.

The at least one air duct element and the at least one air outflow element and the at least one directional element can be arranged in a roof region of the interior and/or in a back of at least one seat element. In this way, especially good and flexible adjustment is possible, so that especially high comfort can be achieved.

Also, the at least one directional element can be manually or electrically movable, wherein in the case of electrical movability the ventilation device is coupled to a programmable air conditioning system in such a manner that the at least two ventilation states and the lighting effect are adjustable as a function of an activated program of the air conditioning system. In this way, especially good and flexible adjustment is possible, so that especially high comfort can be achieved. In particular, the result can also be achieved that passengers are able to intuitively recognize the active ventilation state on the basis of the lighting effect.

Furthermore, at least one directional element can be arranged in the non-visible roof region of the passenger compartment, wherein an activation of the at least one directional element causes a change in shape of the adjacent visible roof region, or an activation of the at least one directional element causes an unfolding of this directional element out of the non-visible roof region of the passenger compartment into the visible roof region so that in each of the two cases a direction of air flowing out of the at least one air outflow element can be adjusted from one ventilation state into another ventilation state. Consequently, an exceptional comfort can be achieved. The passenger compartment can be utilized to the greatest extent by the passengers, since a space-saving and economical concept can be realized as a result.

The at least one directional element can be arranged on the at least one air outflow element, wherein an activation of the at least one directional element has the effect that a direction of air flowing out of the at least one air outflow element can be adjusted from one ventilation state into another ventilation state. Consequently, a high level of comfort can be achieved on account of flexible adjustment of airflows.

The at least one directional element can include a set of louvers, wherein the set of louvers includes louvers in the visible region as well as louvers in the non-visible region. Consequently, a high level of comfort can be achieved on account of flexible adjustment of airflows. In other words, the shaping of the airflows can be achieved by means of louvers that are arranged inside the air outflow element or the vent so that a desired ventilation function is achieved. It is thus possible, for example, to provide draft-free ventilation or a more direct flow as desired. As a result, therefore, a switchability of the ventilation function is possible by changing the louver position within the vent.

The at least one directional element can include at least one blocking element, wherein the blocking element either is movable by means of a slide mechanism and a grip element provided for this purpose, which is arranged on the blocking element, or is movable by means of a tilting mechanism. Consequently, a high level of comfort can be achieved on account of flexible adjustment of airflows.

A region of the directional element that is arranged in the visible region of the passenger compartment can simultaneously be configured as a decorative element. In this way, not only can a high level of comfort be achieved on account of flexible adjustment of airflows, but also the passenger compartment can be utilized very efficiently at the same time, since a space-saving and economical concept can be realized as a result.

The supply device can be coupled to the air conditioning system through a front/center console air conditioning unit or is coupled to the air conditioning system through a rear air conditioning unit. In this way, not only can a high level of comfort be achieved on account of flexible adjustment of airflows, but also the passenger compartment can be utilized very efficiently at the same time, since a space-saving and economical concept can be realized as a result.

A motor vehicle with a ventilation device is also provided. In such a motor vehicle, a high level of comfort be achieved on account of a flexible adjustment of airflows in a manner that is intuitive for passengers.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
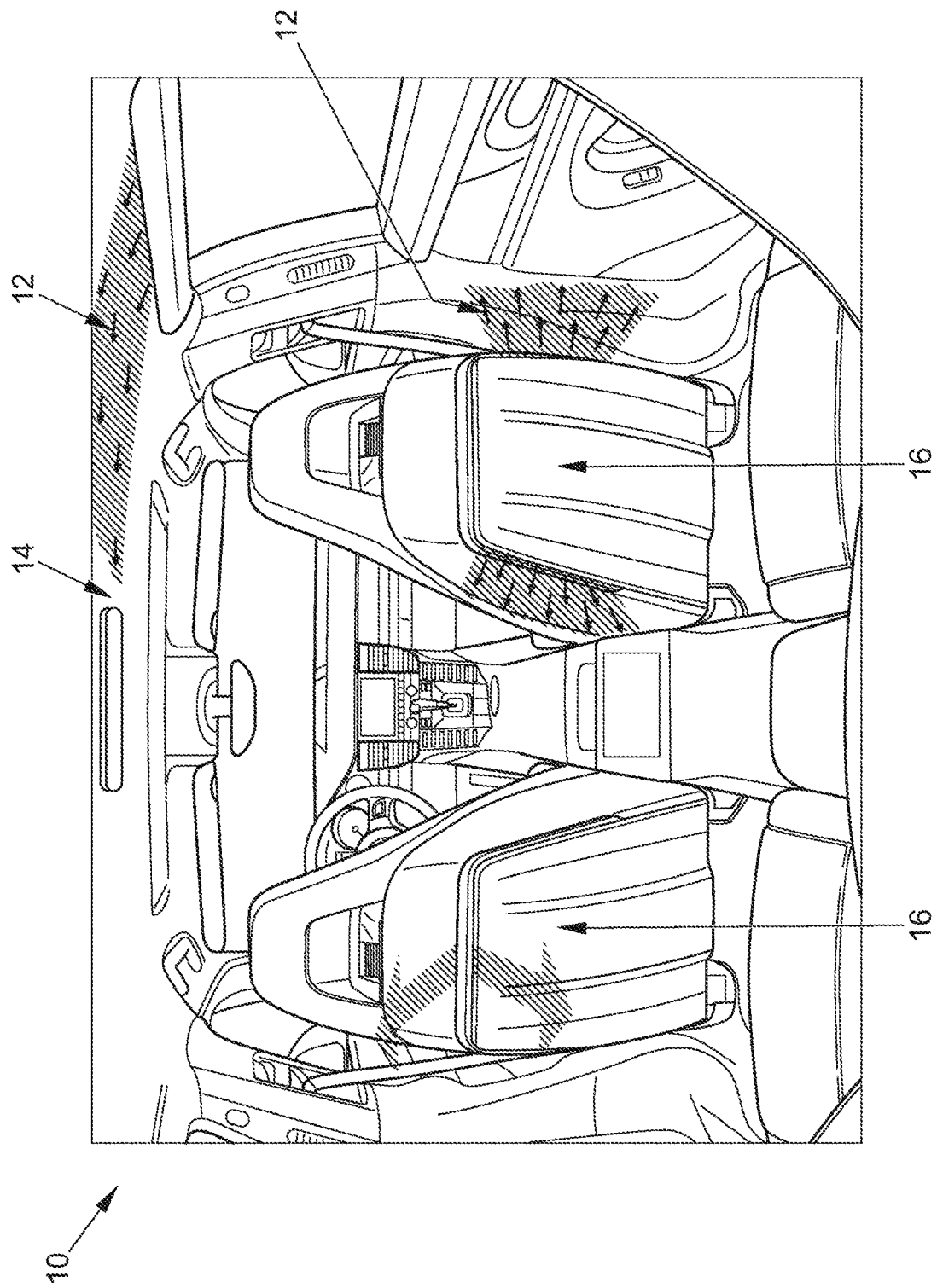
FIG. 1 shows a ventilation device in an installed state.

FIG. 1 shows a ventilation device 10 in an installed state in an interior of a motor vehicle. In the adjustment positions shown, flow arrows 12 show the pathway of air flowing out of the ventilation device 10. In this exemplary embodiment in FIG. 1, the individual components of the ventilation device 10 are arranged in a roof region 14 of the interior as well as in a relevant back of seat elements 16 in the non-visible region. Here, the outflowing air is in a ventilation state that provides an indirect direction of the outflowing air in each case. The flow arrows 12 are depicted merely by way of example here, and they show only one of various possible pathways of an ensuing direction or of an at least partial pathway of the outflowing air. The flow arrows 12 at the seat elements, in particular, can also point at least partially toward the roof region 14 so that outflowing air coming from the seat elements could also spread out along the roof region 14. Starting from the seat elements, such an airflow would thus spread out to the roof region 14, where it would be deflected in various directions so that an indirect airflow ensues. Thus, an airflow along the roof region 14 can be established as well, for example. The roof region 14 includes all areas located above an interior of a motor vehicle. In particular, this is an area between two opposing side windows. Depending on the preferred direction of an installed ventilation device 10, and in interaction with the individual components mentioned above, the roof region 14 can be designed appropriately for these purposes, for example so as to also prescribe an indirect direction of the outflowing air.

Figure 2:
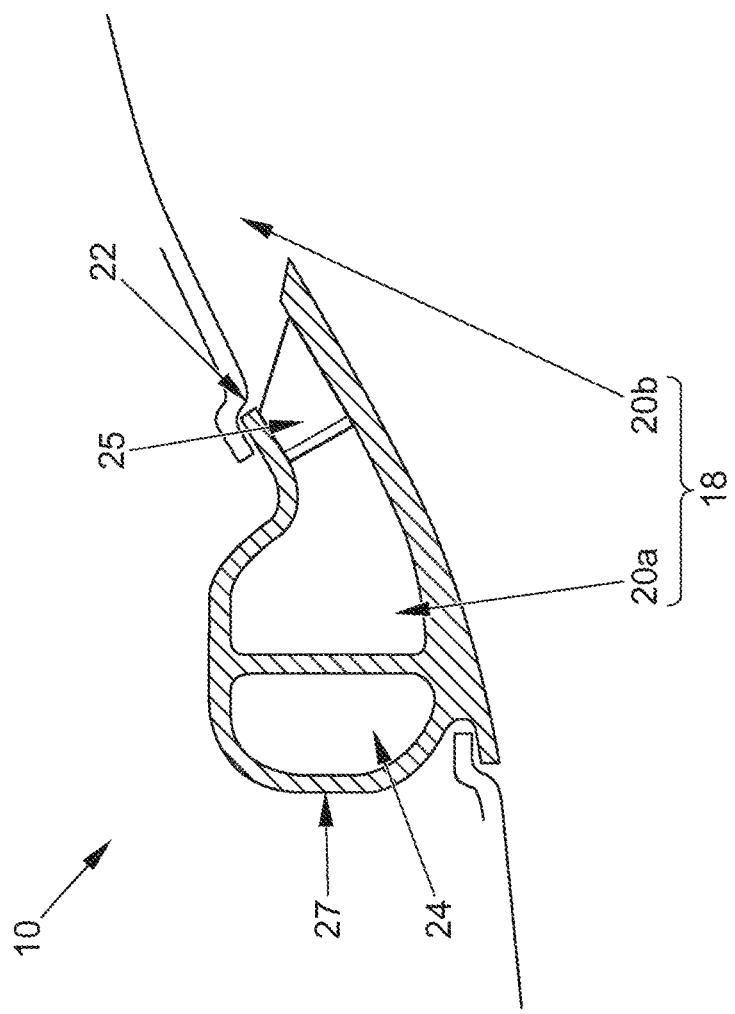
FIG. 2 shows a schematic sectional view of a ventilation device.

FIG. 2 shows a schematic sectional view of a ventilation device 10. This view includes an air duct element 18, which in this example includes two air ducts 20a and 20b. In this case, only the exemplary positioning of each of these air ducts 20a and 20b is shown in FIG. 2. In addition, an air outflow point 22 can be seen. The air outflow point 22 is part of an air outflow element 24, which is only shown by way of example in this FIG. 2. Such an air outflow element 24 could also be referred to as a blade vent. It is conceivable that the air outflow element 24 has a different form from the one shown in FIG. 2. The arrangement of the air ducts 20a, 20b and of the air outflow element 24 is also shown only by way of example here. A directional element 25 can likewise be seen in this exemplary embodiment. In this context, such a directional element 25 can, as shown, be at least partially integrated into the structure of the air outflow element 24 in such a manner that components adjoin this element or other components, even integrally, for example. This is possible to a degree of freedom such that at least one component of the directional element 25 remains separately movable. Visible in FIG. 2, in particular, is the degree to which the air outflow element 24 and the directional element 25 interact so that an airflow, which is moving at the air outflow point 22 from a non-visible region of the ventilation device 10 toward a visible region of the ventilation device 10, is directed. As a result, different ventilation states can be realized as a function of the position of the directional element 25. Any other combination with regard to a spatial arrangement of these components of the ventilation device 10 is possible at this point, as long as it ensures the possibility of at least two ventilation states, namely an indirect and a direct routing of the air. The number of air ducts in the air duct element 18 is not particularly limited. It would likewise be possible for the air duct element 18 to be composed of just one air duct 20, which accordingly then supplies air to all the intended air outflow points 22 of a ventilation device 10. The air duct 20a is provided in the visible area of the lateral roof region 14. An outer region 27 of the air outflow element 24 could be designed in this case such that this outer region 27 is integrated consistently into the visual appearance of the roof region 14 or cannot be distinguished visually therefrom. The air duct 20b is arranged outside the visible region in FIG. 2, and is represented solely by means of its possible positioning. For example, such an air duct 20b could also be part of another component of the vehicle body. In addition, such an air duct 20b could be a separate component in the form of a tube, a tubular object, or another geometric structure that is designed to conduct air to an intended air outflow point 22. A lighting effect that is not shown could be provided by means of lighting elements in the form of light guides, for example. The exemplary embodiment from FIG. 2 is preferably intended for use in the roof region 14. It is a direct goal here to permit indirect ventilation by means of flow along a ceiling line in a selected ventilation state of the ventilation device 10.

Figure 3:
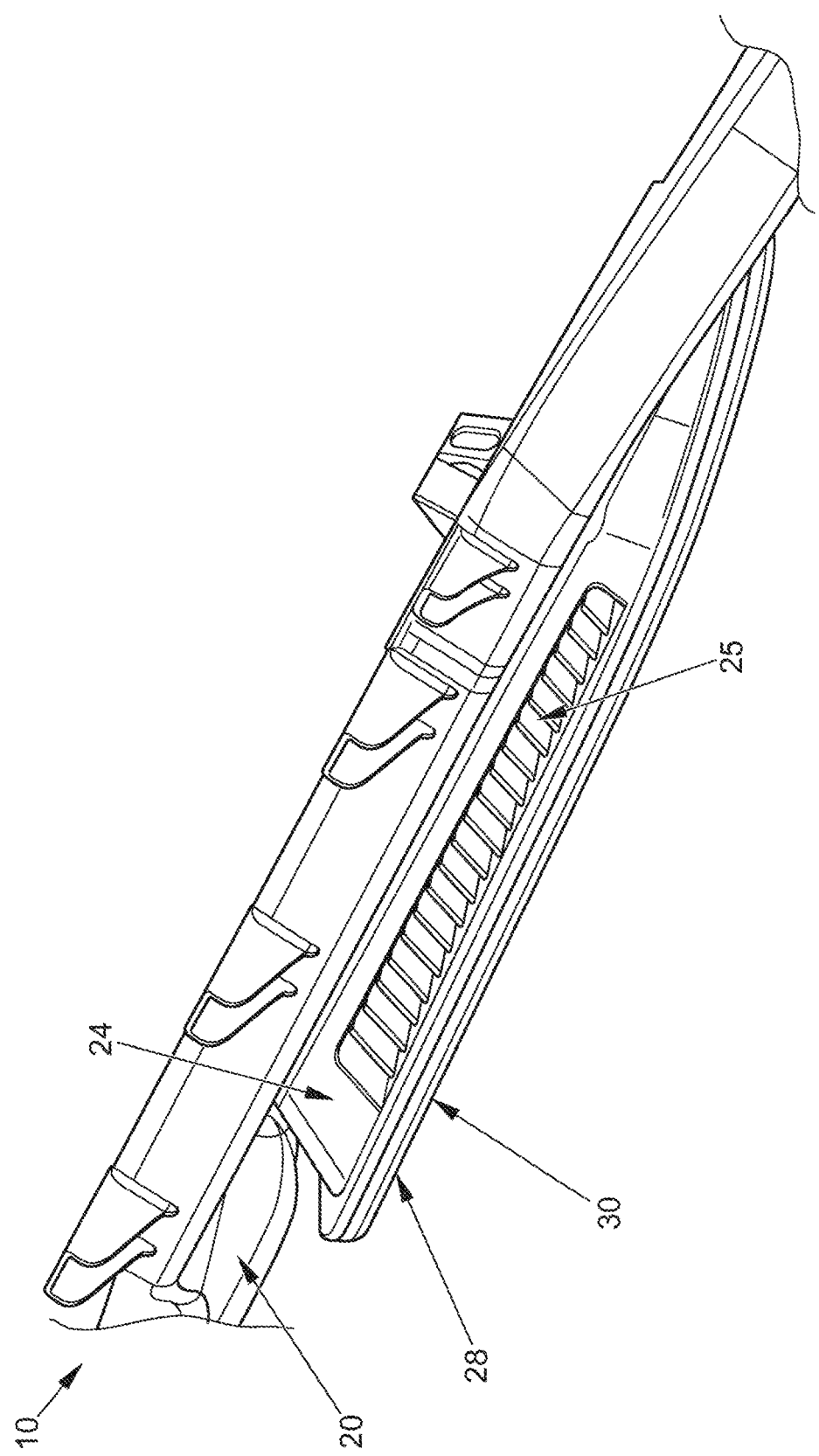
FIG. 3 shows an air outflow element, with a directional element arranged therein, in a seat element.

Shown in FIG. 3 is an air outflow element 24, with a directional element 25 arranged therein, in a seat element 16. The directional element 25 is shown here in the form of louvers 36, which can be movably mounted. The louvers 36 can provide for uniform air distribution along the ceiling line on account of their positioning or their adjustments. In this context, an electrical directability can be realized by means of an electrical device in the form of an electric motor, for example, in order to thus permit different ventilation styles. The air outflow element 24 is coupled to an air duct 20, which in turn is part of an air duct element 18. The supply of air to the air duct 20 can be accomplished either from the left—with respect to the plane of the image—by means of a supply device (not shown) in the form of a rear air conditioning unit or from the right by means of a supply device (not shown) in the form of a front/center console air conditioning unit. Additionally shown in FIG. 3 is a trim panel 28 that is arranged as a separating element between the air outflow element 24 with directional element 25 arranged therein and a visible region of the seat element 16. In other words, this trim panel 28 delimits the air outflow element 24 with directional element 25 arranged therein in such a manner that an observer perceives the ventilation device 10 solely on account of the effect in the form of provided air and not visually as a separate component that is clearly visually distinct from the other components of the seat element 16. The trim panel 28 can additionally include a lighting element 30 in the form of a light guide so that a lighting effect for the selected ventilation function in question is possible. By means of the exemplary embodiment shown in FIG. 3, therefore, it is possible to couple air into a seat structure, and this can then be accompanied by a lighting effect when a user has additionally selected this function. Integration into a back panel is therefore possible. It is also conceivable that a lighting effect can be switched on and off intentionally or have a functional relationship with a relevant selected program of an air conditioning system.

Figure 4:
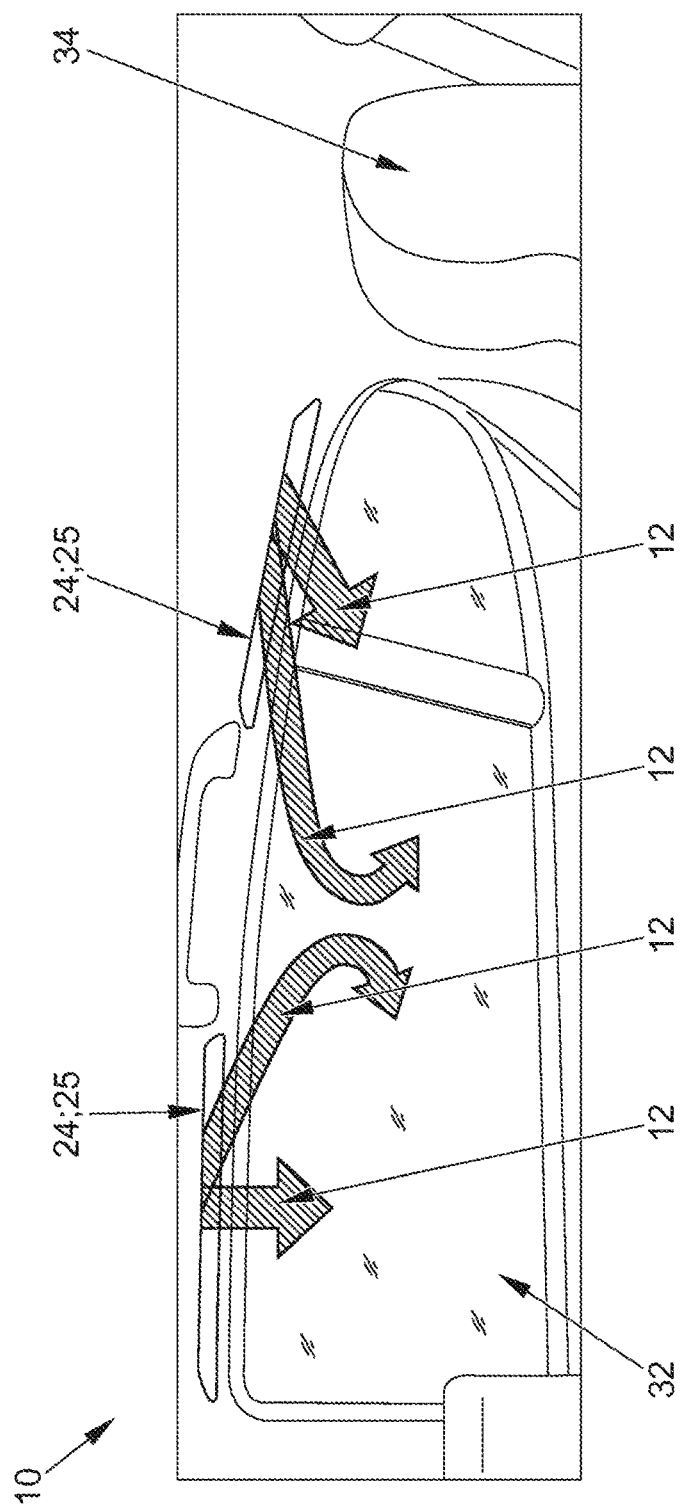
FIG. 4 shows a ventilation device in the installed state.

FIG. 4 shows a ventilation device 10 in the installed state. A window 32 in a rear passenger compartment of a motor vehicle and a headrest region 34 of a seat structure in the rear compartment of this motor vehicle can be seen. The ventilation device 10 here includes, for example, two depicted air outflow elements 24 with respective directional elements 25 that are not shown in detail. In this example, the air outflow elements 24 with respective directional elements 25 that are not shown in detail are arranged in the visible region in such a manner that they are markedly visually distinct from the rest of the roof region 14. The flow arrows 12 that are shown here indicate both a possible direct ventilation state and an indirect ventilation state. It would be possible in the case of one or both of the at least two adjustable ventilation states that air also impinges on at least a subregion of the window 32 in such a manner that a desired effect occurs here, for example a clear view to the outside. Consequently it is also possible, for example, to realize indirect ventilation from the rear and from roof rails that are not shown.

Figure 5B:
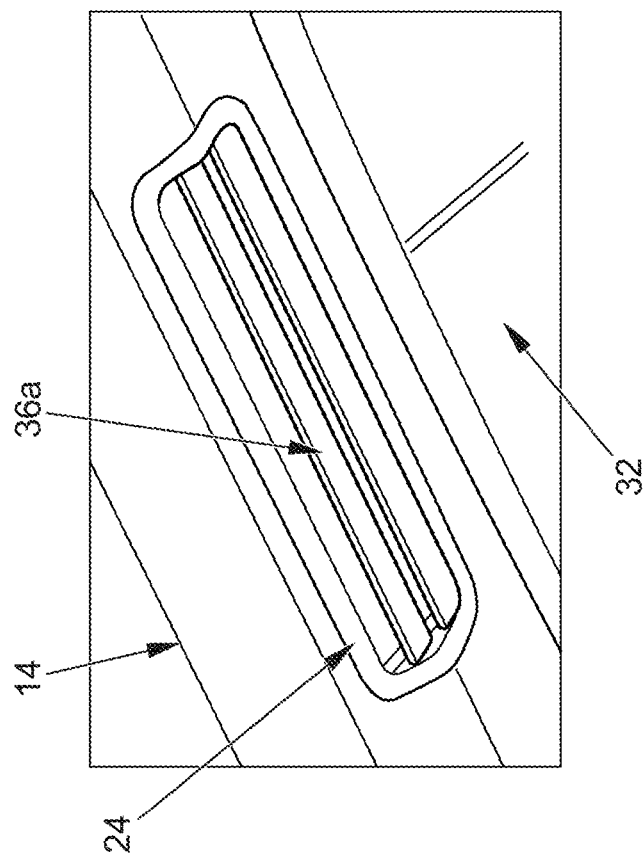
FIG. 5b shows a directional element in an installed state.
Figure 5A:
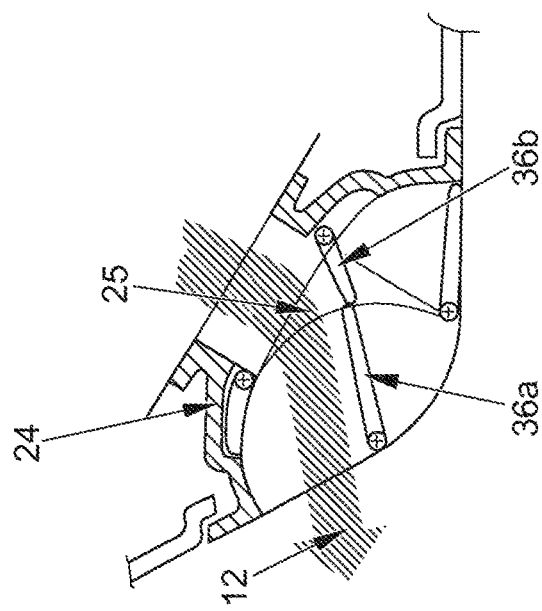
FIG. 5a shows a sectional view of an air outflow element with a directional element arranged therein.

FIG. 5a shows, as components of a ventilation device 10, a sectional view of an air outflow element 24 with a directional element 25 arranged therein, wherein the directional element 25 is implemented in the form of louvers 36. In this design, the louvers 36 are divided into louvers 36a in the visible region and louvers 36b in the non-visible region. In the visible region, two louvers 36a can be seen, and two louvers 36b can likewise be seen in the non-visible region. In all, therefore, four louvers 36 are provided. In a variant that is not shown, the number of louvers 36 can differ and can have any number of louvers 36 that is advantageous. The shape of the louvers 36 in this figure likewise should only be considered as an example, and any other shapes of louvers 36 are also possible as long as a desired direction of an airflow can be established as a result. The invention is not restricted in this point to the exemplary embodiment shown. The louvers 36b are thus arranged in the background of the air outflow element 24. In the figure shown, one of these louvers 36b is moved such that it disappears at least partially or completely into a wall of the air outflow element 24 that is at least partially exposed to the airflow, and together with the wall of the air outflow element 24 has a desired effect on the outflowing air. The shape of the wall of the air outflow element 24 can accordingly be matched to a shape of the louvers 36 so that ultimately the interaction at least partially provides the desired effect on the outflowing air. In other words, at least one louver 36b can be moved such that it represents an extension of an outer line of the wall or has a combined effect on an outflowing air together with the wall in which it is attached. Such a louver 36b can be rotatably attached in the wall, for example with a hinge or a screw or another fastener. In this design, the wall, or the air outflow element 24 in general, can have a recess in which the louver 36b can rest in a foldable state at least partially in a positive manner. The opposite louver 36b is constructed in a similar manner and is shown in the figure. In a variant that is not shown, it is conceivable that only one of these at least two louvers 36b has an interaction with the wall, and the respective at least one other louver 36b then merely rests in an adjacent region of the wall. These and other arrangements (not shown) of the various louvers 36b should in each case be considered in light of the desired interaction of the overall concept, wherein each change in a louver 36 has an effect on a resulting airflow pathway, so that this state can in turn be changed accordingly by a further change of a further louver 36. The louvers 36a can at least partially take on the function of a decorative element 38 in the visible region. In other words, the design of the directional element 25 can take place here such that a visual conformity with a desired general impression of the interior of the motor vehicle is made possible. The louvers 36a and 36b in FIG. 5a are adjusted so as to produce a desired pathway of the flow arrow 12 shown. The louvers 36a and 36b can be connected to the air outflow element 24 by means of hinges, for example. Any other means of attachment is likewise possible here. It is conceivable in this regard that the louvers 36a, 36b can assume a wide variety of positions in order to achieve a desired pathway of the flow arrow 12. In this case, the louvers 36a, 36b can be movable independently of one another. In another variant, it is also conceivable that the louvers 36a, 36b are movable at least partially coupled to one another. In other words, a deflection of any desired louver 36 would then cause a motion of one or more other louvers 36. It is also possible that all said louvers 36 can be oriented in a desired manner by just a single process as a result. In particular, the interaction of two louvers 36 at a time and the resulting arrangement relative to one another can bring about a desired pathway of the flow arrow 12. It is also conceivable that the louvers 36a, 36b are each individually movable and the interaction is controlled centrally so that a resulting arrangement is ultimately produced that brings about a desired pathway of the flow arrow 12.

FIG. 5b shows, as components of a ventilation device 10, the air outflow element 24 with a directional element 25 from FIG. 5a arranged therein from the viewpoint of an observer seated in an interior of a motor vehicle in which these components of the ventilation device are arranged. The louvers 36a in the visible region, which at least partially take on the function of a decorative element 38, can be seen. A decorative element 38 preferably has the function of visually delimiting the ventilation device 10 relative to a visible interior of the motor vehicle. A subsection of the air outlet element 24, which at least in this subsection likewise takes on the function of a decorative element 38, can also be seen. However, other arrangements (not shown) of the air outlet element 24 with the directional element 25 arranged therein are also conceivable. For example, the louvers 36a could likewise fully take on the function of the decorative element 38.

Figure 6A:
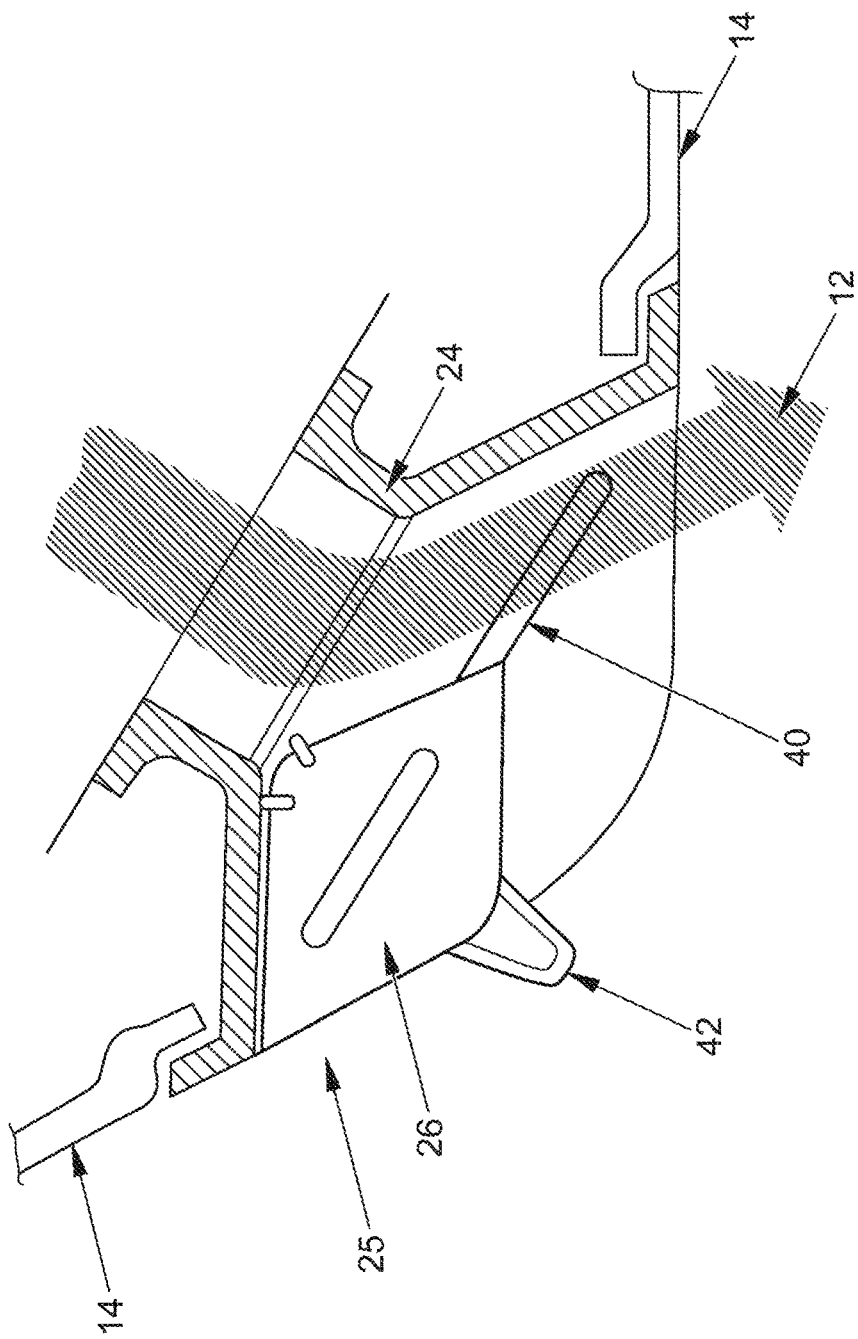
FIG. 6a shows a sectional view of a directional element in an installed state.

In FIG. 6a, another example of a directional element 25 in an installed state can be seen. This directional element 25 is arranged in an air outflow element 24. Both components are parts of a ventilation device 10. The directional element 25 shown is arranged on the air outflow element 24 by means of a slide mechanism 40, so that various ventilation states can be adjusted by either manual or electrical movement. In the figure, the slide mechanism 40 is arranged centrally and has a straight pathway from the lower right (relative to the plane of the image) to the upper left. In a variant that is not shown, this slide mechanism 40 could also have a curved pathway or a pathway of any other shape. In the example shown in FIG. 6a, the adjustment is such that a desired pathway of a flow arrow 12 is established. The directional element 25 includes a blocking element 26, which can have the essentially diamond-shaped geometry shown. In addition, in the figure the slide mechanism 40 is arranged on the blocking element 26 essentially in the center. Here, too, additional variations that are not shown are possible. Any other geometric shapes that make it possible to allow a direct or indirect airflow are also conceivable, however. In this regard it is necessary to ensure, however, that the geometric shape is chosen such that the blocking element 26 at least substantially rests against a corresponding wall of the air outflow element 24 in a stop position, as is depicted in the exemplary embodiment, so that the passage of air is prevented or at least largely avoided at this location. In other words, the shape of the blocking element 26 and the shape of the wall of the air outflow element 24 that is reached by the blocking element 26 in a relevant stop position should be at least partially matched to one another in a formfitting manner at this location so that it is essentially impossible for air passage to occur here. This is shown in the figure by the means that a flat side of the diamond-shaped body of the blocking element 26 is positioned flat against the wall of the air outflow element 24 so that it is essentially impossible for air to escape here and the flow arrow 12 can be guided in the desired direction as shown. The way the air outflow element 24 and the directional element 25 together bring about a desired flow pathway of an airflow from within the ventilation device 10 into an interior (not shown) of a motor vehicle can be seen, in particular. For this purpose, the geometries of the two aforementioned components are advantageously matched to one another here, for example. Furthermore, a grip element 42, which can also be referred to simply as a handle, is visible on the directional element 25. This grip element 42 can be manually gripped by a user, for example, in order to then move the directional element 25 into a desired position so that a defined ventilation state is established. This ventilation state can then have a direct or indirect airflow, for example. However, it is also conceivable that the directional element 25 can be operated by means of an electrical device, for example an electric motor, wherein operation is possible through, e.g., an air conditioning control of an air conditioning system of a motor vehicle in which the ventilation device 10 is installed.

Figure 6B:
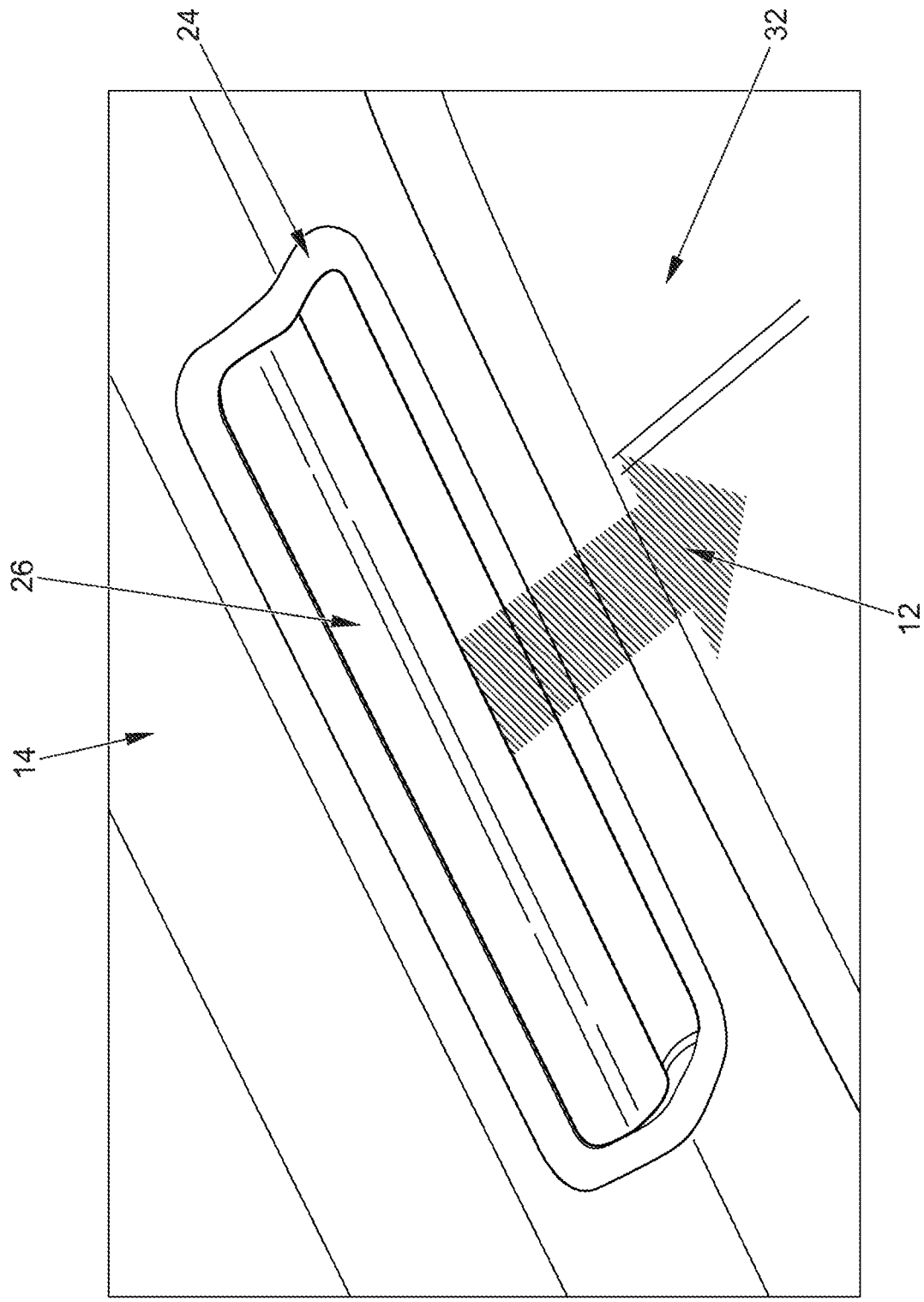
FIG. 6b shows a directional element in an installed state.

FIG. 6b shows, as components of a ventilation device 10, the air outflow element 24 with a directional element 25 from FIG. 6a arranged therein from the viewpoint of an observer seated in an interior of a motor vehicle in which these components of the ventilation device are arranged. A roof region 14 and a part of a window 32 can be seen. The directional element 25 is depicted in FIG. 6b with no grip element 42, and is located in an upper position so that a flow arrow 12 points toward the window 32. A direct ventilation state on the window pane is thus established.

Figure 6C:
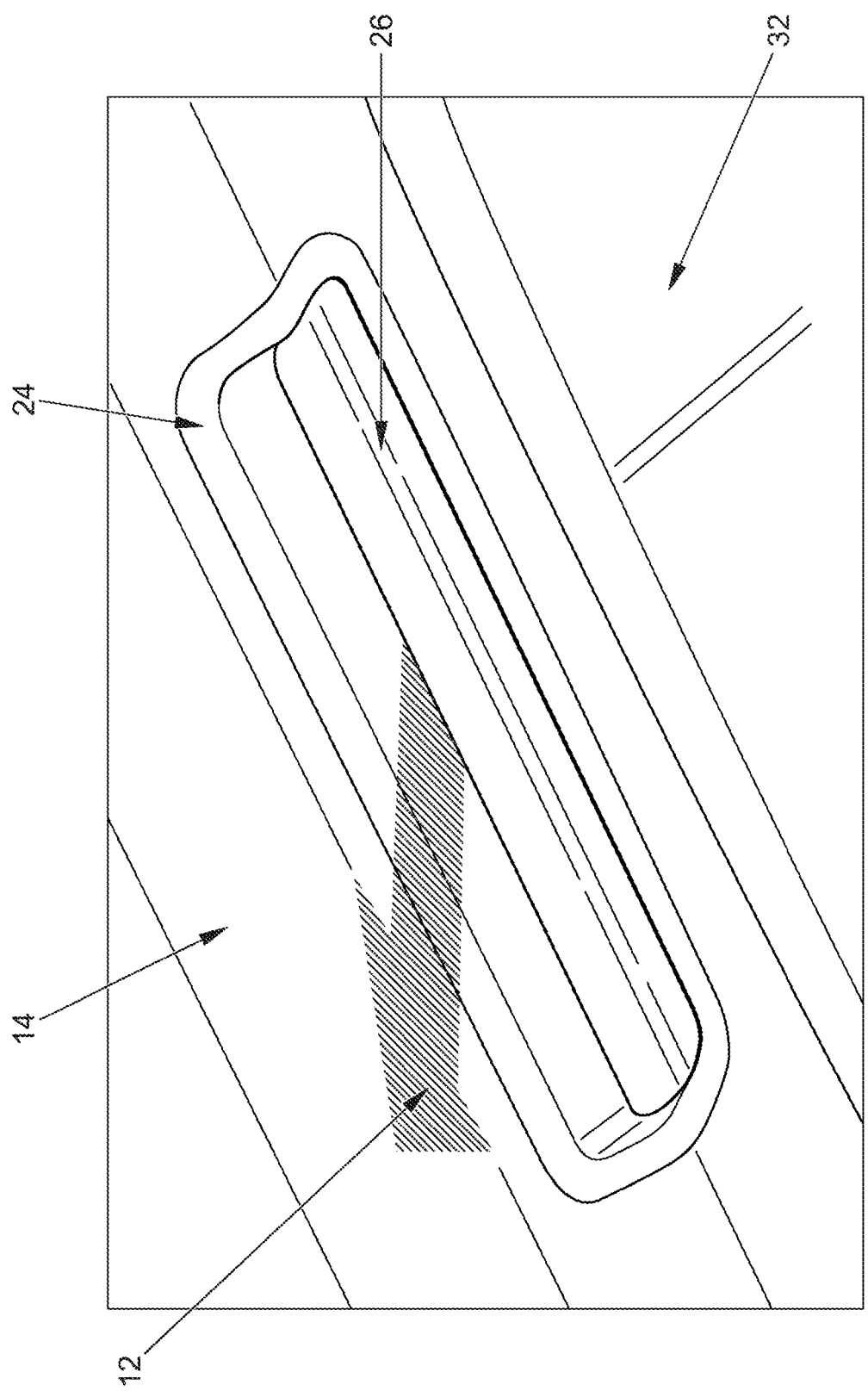
FIG. 6c shows a directional element in an installed state.

FIG. 6c shows, as components of a ventilation device 10, the air outflow element 24 with a directional element 25 from FIG. 6a arranged therein from the viewpoint of an observer seated in an interior of a motor vehicle in which these components of the ventilation device 10 are arranged. A roof region 14 and a part of a window 32 can be seen. The directional element 25 is depicted in FIG. 6b with no grip element 42, and is located in a lower position so that a flow arrow 12 points toward the roof region 14. An indirect ventilation state is thus established.

Figure 7A:
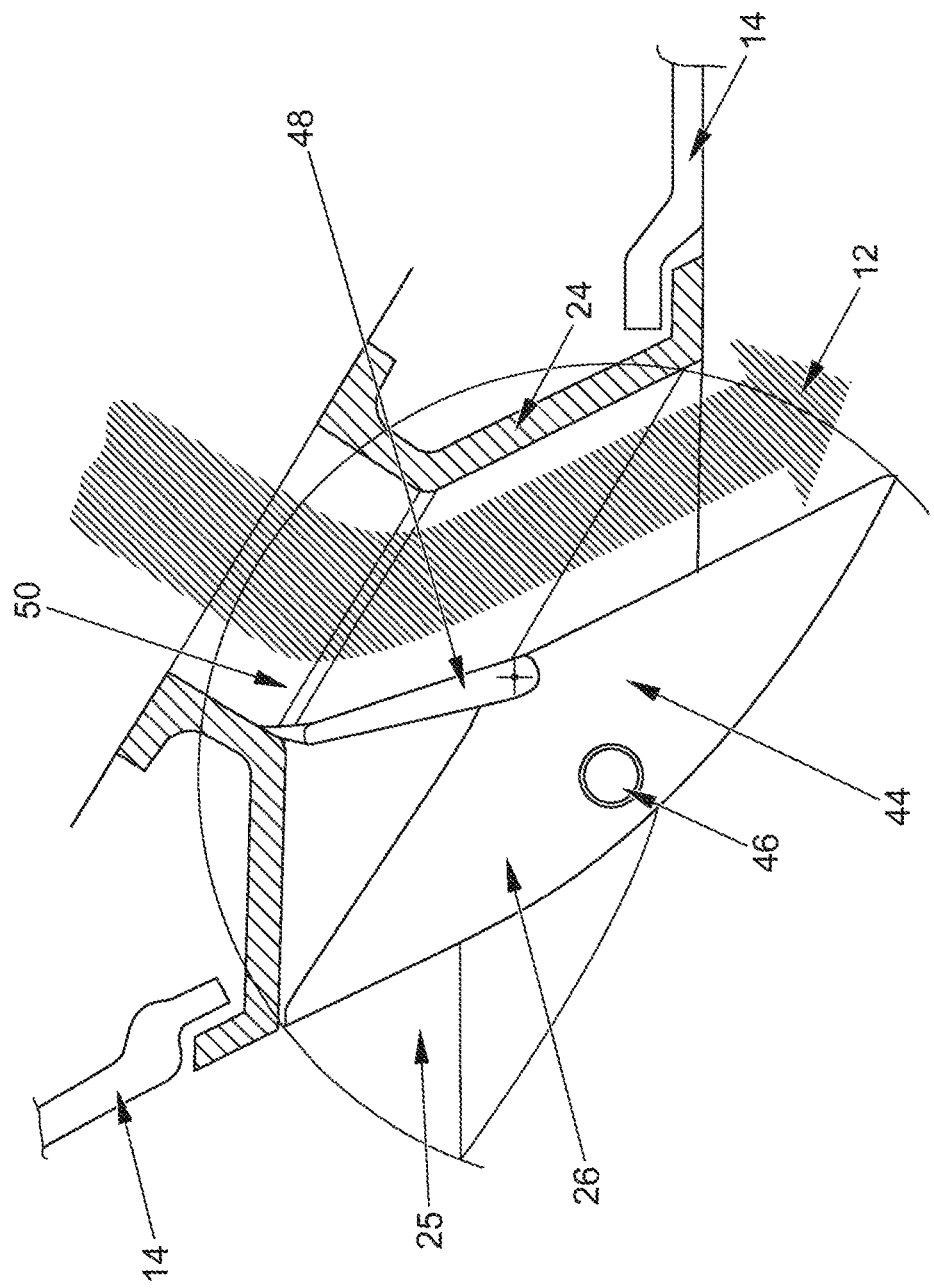
FIG. 7a shows a sectional view of a directional element in an installed state.

In FIG. 7a, another example of a directional element 25 in an installed state can be seen. This directional element 25 is arranged in an air outflow element 24. Both components are parts of a ventilation device 10. The directional element 25 shown is arranged on the air outflow element 24 by means of a tilting mechanism 44, so that various ventilation states can be adjusted by either manual or electrical movement. In the example shown in FIG. 7a, the adjustment is such that a desired pathway of a flow arrow 12 is established. The directional element 25 includes a blocking element 26, which can have essentially the shape shown in the figure of a diamond or a diamond-shaped body or form. This diamond-shaped form is modified in the manner shown, in particular in the visible region, by means of a curved pathway of a front side visible toward the outside. In other words, the diamond-shaped blocking element 26 is delimited toward the outside in the visible region by a surface (sketched as a line in the figure) that bulges outward into the interior of a motor vehicle that is not shown otherwise. This convex shape can appear appropriately matched to the immediate surroundings of the interior of the motor vehicle such that a fluid transition from the immediate surroundings to the blocking element 26 occurs. In the figure shown, this is indicated in the upper left region (relative to the plane of the image) in that the curved line is represented essentially as an extension of an outer line of the roof region 14 shown at the upper left. In other words, the blocking element 26 is shaped in the visible region such that an essentially smooth transition from the roof region 14 to an outer surface of the blocking element 26 occurs. Any other geometric shapes of the blocking element 26 that make it possible to allow a direct or indirect airflow are also conceivable, however. The above-mentioned features can also be established or taken into account in the case of a different contouring or an only slightly altered contouring. In particular, the interaction between the curve of the roof region 14 and an outer surface of the blocking element 26 can be taken into account here. The way the air outflow element 24 and the directional element 25 together bring about a desired flow pathway of an airflow from within the ventilation device 10 into an interior (not shown) of a motor vehicle can be seen, in particular. For this purpose, the geometries of the two aforementioned components are advantageously matched to one another here, for example. The tilting mechanism 44 in this example includes both a hinge 46, which is arranged in the center on the directional element 25, and an internal setting element 48, which is arranged on a rail element 50 in the air outflow element 24. In addition, one possible additional position for just the tilting mechanism 44 is shown in the figure. Any other intermediation position can be assumed between the current position shown and the additional position. The setting element 48 can then likewise assume a different position, wherein this position is not shown. In this case, the interaction between the tilting mechanism 44 and the setting element 48 can take on any arrangement that is permitted by the mechanical characteristics of the installed arrangement so that a desired pathway of the flow arrow 12 is established again. Here, too, a coupling that is not shown in detail is possible. Coupling elements of any type or even only one coupling element is conceivable here. Once again, an individually controllable arrangement with a mutually independent type of motion is possible, wherein the specific arrangement is then controlled centrally so that a desired pathway of the flow arrow 12 is established or can be established in turn. An extremely wide variety of ventilation concepts can be continuously adjusted depending on the intensity of the applied flow and, in particular, by means of the interaction of the tilting mechanism 44 and the setting element 48, so that an especially flexible and easy-to-operate arrangement can be provided.

Figure 7B:
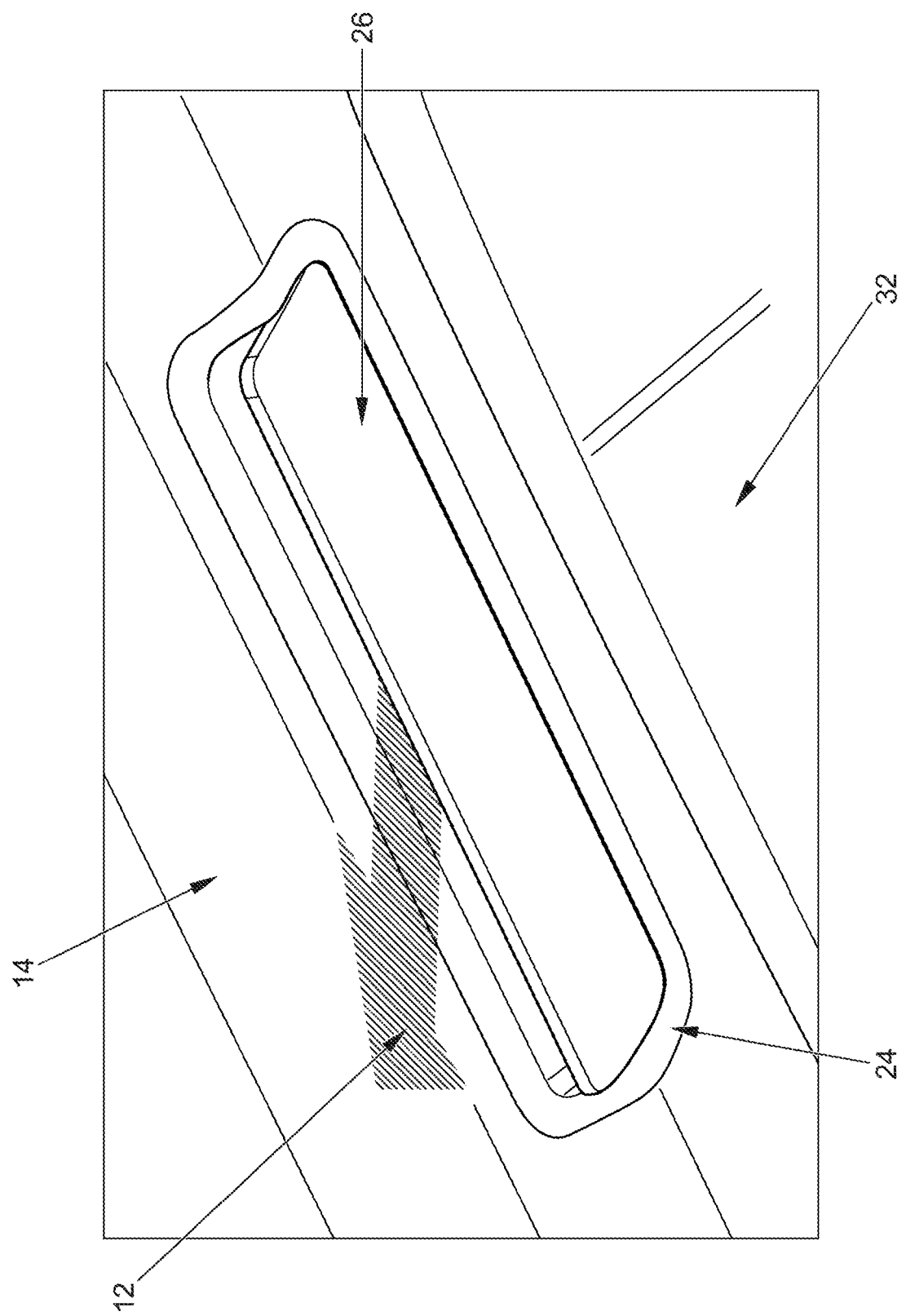
FIG. 7b shows a directional element in an installed state.

FIG. 7b shows, as components of a ventilation device 10, the air outflow element 24 with a directional element 25 from FIG. 7a arranged therein from the viewpoint of an observer seated in an interior of a motor vehicle in which these components of the ventilation device 10 are arranged. A roof region 14 and a part of a window 32 can be seen. The directional element 25 is depicted in FIG. 7b with no grip element 42, and is located in a lower position so that a flow arrow 12 points toward the roof region 14. An indirect ventilation state is thus established.

Figure 8:
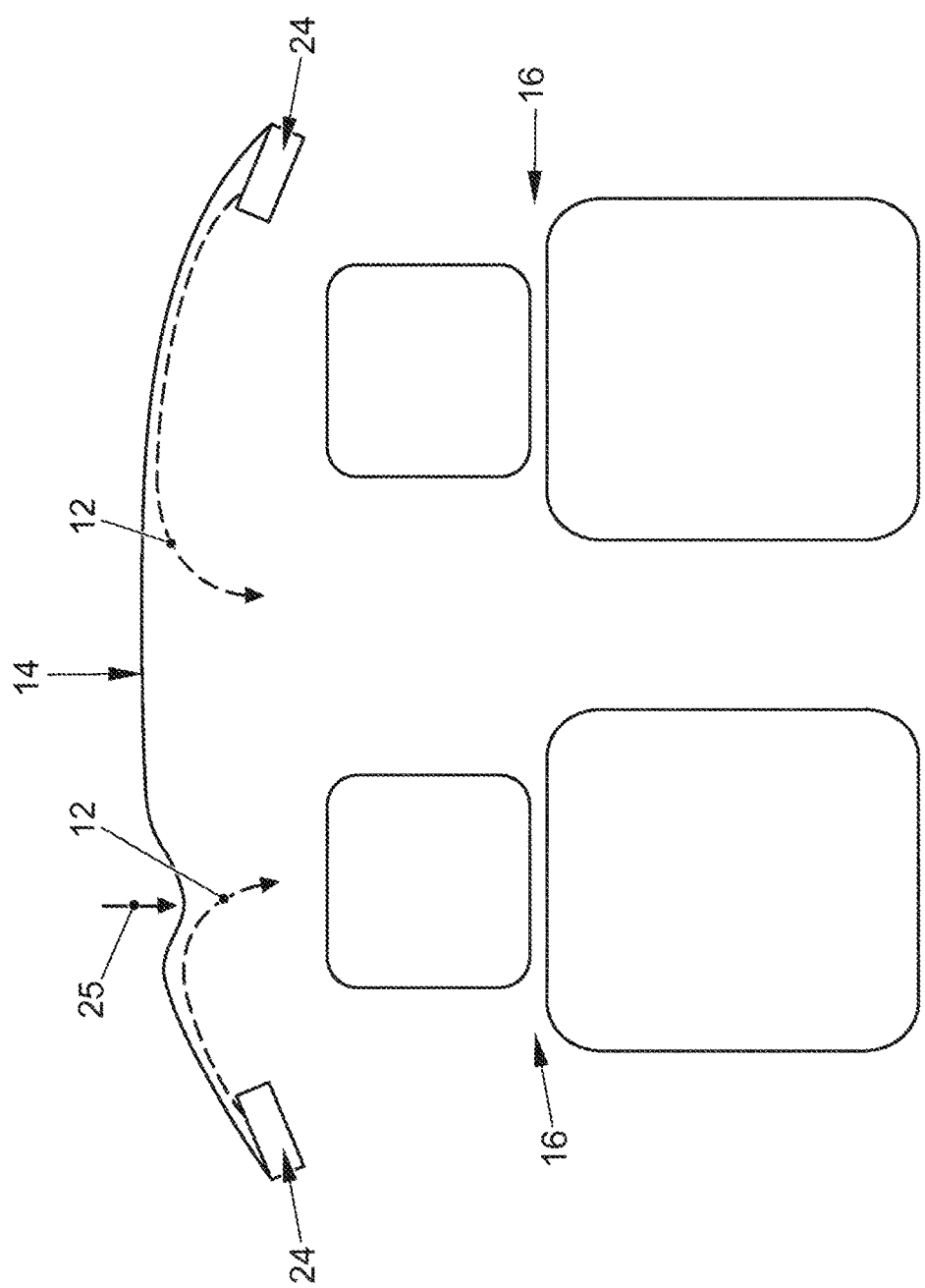
FIG. 8 shows a schematic top view of a ventilation device.

FIG. 8 shows a schematic top view of a ventilation device 10. Two schematically represented air outflow elements 24 from which airflows can be seen, wherein the flow path in this exemplary embodiment is represented by dashed flow arrows 12. These air outflow elements 24 can also be referred to as static vents. A roof region 14 is also represented schematically. This roof region 14 curves above two seat elements 16, likewise shown schematically, relative to the plane of the image. Once again relative to the plane of the image, a directional element 25 is shown schematically on the left side above the seat element 16, and in this FIG. 8 is represented as a downward-pointing arrow. This directional element 25 is in an extended state so that the subregion of the roof region 14 located directly below it curves downward. In other words, the disposition of the directional element 25, which in this case can also be referred to as an actuator, has the result that a change occurs in the shape of a headliner above this seat element 16 located on the left side in order to thus permit a targeted influencing of the airflow by means of the directional element 25 or the actuator. In an alternative that is not shown, it is also conceivable that the directional element 25 can unfold from the roof region 14 in order to thus bring about a desired ventilation state. In both cases, a direct ventilation state results, which can also be referred to as direct flow. A direct ventilation state can thus be made possible by the opening of one or more such directional elements 25 behind the air discharge area. Opposite, on the right side relative to the plane of the image, no directional element 25 is shown since this element is in a non-activated state. Consequently, an indirect flow pathway of the air flowing out of the air outflow element 24 is established so that an indirect ventilation of an interior of the motor vehicle, which can also be referred to as the cabin, is possible. This indirect ventilation thus has the result that the outflowing air spreads out along the headliner because the headliner thus is now smooth and without obstacles to flow. In this example, too, either manual adjustability or electrical actuation, for instance through the air conditioning control, can be provided here. Since the air outflow elements 24 are opposite one another, a directability of the ventilation device 10 that is distinguished by reciprocal or alternating airflow can also be established. In other words, a reciprocal, alternating airflow to the left and right, which is reminiscent of airflows in a natural environment, can be established or achieved in the motor vehicle. The air outflow elements 24 on the left and right sides can be aimed toward one another, for example, so that turbulence of the air, so-called air rolls, can occur in the middle of the vehicle as a result of the two competing airflows, wherein this turbulence can be perceived as pleasant by a passenger or by an occupant generally, since its direction is not identifiable and its speed is not constant.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A ventilation device for an interior of a motor vehicle, the ventilation device comprising:
    at least one air duct element;
    at least one air supply device that is coupled to a first end of the at least one air duct element as part of an air conditioning system of the motor vehicle;
    at least one air outflow element that is coupled to a second end of the at least one air duct element and is arranged in a non-visible region of a passenger compartment of the interior;
    at least one directional element; and
    at least one lighting element,
    wherein of the at least one directional element is arranged with the at least one air outflow element so that the ventilation device is continuously adjustable between at least two ventilation states in the interior that each differ with respect to a seat region of the motor vehicle at least by a direction of outflowing air that is aimed directly into the passenger compartment and a direction of outflowing air that is aimed indirectly along a headliner of the passenger compartment.

2. The ventilation device according to claim 1, wherein a lighting effect is adjustable as a function of the at least two ventilation states via the at least one lighting element.

3. The ventilation device according to claim 1, wherein the at least one air duct element, the at least one air outflow element and the at least one directional element are arranged in a roof region of the interior and wherein an additional air outflow element and an additional directional element are arranged in a back of at least one seat element.

4. The ventilation device according to claim 2, wherein the at least one directional element is manually or electrically movable, wherein in the case of electrical movability the ventilation device is coupled to the air conditioning system, which is programmable, such that the at least two ventilation states and the lighting effect are adjustable as a function of an activated program of the air conditioning system.

5. The ventilation device according to claim 1, wherein the at least one directional element is arranged in a non-visible portion of a roof region of the passenger compartment, wherein an activation of the at least one directional element causes a change in shape of a visible portion of the roof region that is adjacent to the non-visible portion or wherein an activation of the at least one directional element causes movement of the at least one directional element out of the non-visible portion of the roof region of the passenger compartment into the visible portion of the roof region so that a direction of air flowing out of the at least one air outflow element is adjustable from one of the at least two ventilation states into another one of the at least two ventilation states.

6. The ventilation device according to claim 1, wherein the at least one directional element is arranged on the at least one air outflow element, wherein an activation of the at least one directional element adjusts a direction of air flowing out of the at least one air outflow element from one of the at least two ventilation states into another one of the at least two ventilation states.

7. The ventilation device according to claim 6, wherein the at least one directional element includes a set of louvers, wherein the set of louvers includes louvers in a visible region of the passenger compartment as well as additional louvers in the non-visible region of the passenger compartment.

8. The ventilation device according to claim 6, wherein the at least one directional element includes at least one blocking element, and wherein the blocking element is movable via a slide mechanism and a grip element, which is arranged on the blocking element or the blocking element is movable via a tilting mechanism.

9. The ventilation device according to claim 1, wherein a portion of the at least one directional element that is arranged in a visible region of the passenger compartment is configured as a decorative element.

10. The ventilation device according to claim 1, wherein the at least one supply device is coupled to the air conditioning system through a front I center console air conditioning unit or is coupled to the air conditioning system through a rear air conditioning unit.

11. A motor vehicle comprising the ventilation device according to claim 1.

12. The ventilation device according to claim 1, wherein the ventilation device is arranged above a side window in the interior of the motor vehicle, such that the outflowing air that is aimed indirectly along the headliner flows, along the headliner, in a direction away from the side window towards an opposing side window.

* * * * *